United States Patent [19]

Terashima et al.

[11] Patent Number: 5,064,568

[45] Date of Patent: * Nov. 12, 1991

[54] FERROELECTRIC LIQUID CRYSTAL COMPOSITION

[75] Inventors: Kanetsugu Terashima; Mitsuyoshi Ichihashi, both of Ichihara; Makoto Kikuchi, Kisarazu; Fusayuki Takeshita, Ichihara; Kenji Furukawa, Yokosuka, all of Japan

[73] Assignee: Chisso Corporation, Osaka, Japan

[*] Notice: The portion of the term of this patent subsequent to Jan. 9, 2007 has been disclaimed.

[21] Appl. No.: 276,389

[22] Filed: Nov. 25, 1988

[51] Int. Cl.$^5$ .................... C09K 19/34; C09K 19/52; C09K 19; C09K 12

[52] U.S. Cl. .................... 252/299.61; 252/299.01; 252/299.65; 252/299.66; 252/299.63

[58] Field of Search .................... 252/299.01, 299.61, 252/299.65, 299.66

[56] References Cited

U.S. PATENT DOCUMENTS

| | | | |
|---|---|---|---|
| 4,744,918 | 5/1988 | Heppke et al. | 252/299.61 |
| 4,824,597 | 4/1989 | Kano | 252/299.61 |
| 4,826,621 | 5/1989 | Terashima et al. | 252/299.61 |
| 4,882,083 | 11/1989 | Terashima et al. | 252/299.61 |
| 4,886,622 | 12/1989 | Miyazawa et al. | 252/299.61 |
| 4,892,393 | 1/1990 | Terashima et al. | 252/299.01 |
| 4,911,863 | 3/1990 | Sage et al. | 252/299.65 |
| 4,931,208 | 6/1990 | Furukawa et al. | 252/299.61 |

FOREIGN PATENT DOCUMENTS

| | | |
|---|---|---|
| 0206228 | 12/1986 | European Pat. Off. . |
| 255219 | 2/1988 | European Pat. Off. . |
| 8705012 | 8/1987 | World Int. Prop. O. ...... 252/299.61 |

Primary Examiner—John S. Maples
Assistant Examiner—Phililp Tucker
Attorney, Agent, or Firm—Fred Philpitt

[57] ABSTRACT

A ferroelectric liquid crystal composition is here provided which contains at least one chiral compound having an optical activity site group represented by the general formula (I)

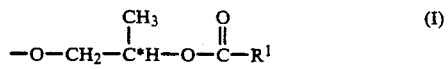

wherein $R^1$ is a straight-chain or branched alkyl group or alkoxy group having 1 to 18 carbon atoms, and * indicates an asymmetric carbon atom, and at least one non-chiral compound having a smectic C phase, a smectic I phase, a smectic F phase, a smectic G phase, a smectic H phase, a smectic J phase or a smectic K phase. This composition has quick response properties and assumes an SC* phase in an extensive temperature range inclusive of room temperature. Furthermore, by using this composition, an optical switching element having quick responsiveness can be obtained.

2 Claims, No Drawings

FERROELECTRIC LIQUID CRYSTAL COMPOSITION

BACKGROUND OF THE INVENTION (1) Field of the Invention

The present invention relates to a ferroelectric liquid crystal material. More specifically, it relates to a ferroelectric liquid crystal composition having quick response properties which comprises a smectic liquid crystal compound and an optically active compound, and an optical switching element which uses this composition.

(2) Description of the Prior Art

Liquid crystal compounds are widely used as materials for display elements, and most of these liquid crystal elements are on TN type display system and liquid crystal materials are in the state of nematic phase.

The TN type display system has advantages such as less tiredness of eyes and extremely small consumption of electric power because of non-emissive type, whereas it has disadvantages such as slow response and disappearance of display at certain visual angles.

In recent years, this system is being improved in such a direction as to keep up characteristics of flat displays, and in particular, the speed-up of response and the enlargement of visual angle are demanded.

In order to meet these demands, improvements in liquid crystal materials have been attempted. However, as compared with other emissive type displays (e.g., electroluminescence displays and plasma displays), it is apparent that the TN type display system is much poorer in points of response time and the extent of visual angle.

In order that characteristics of the liquid display element such as features of the non-emissive type and small consumption of electric power may be maintained and in order that quick response corresponding to that of the emissive type displays may be assured, it is essential to develop a novel liquid display system in place of the TN type display system.

As one of such attempts, a display system in which the optical switching phenomenon of ferroelectric liquid crystals is utilized has been suggested by N. A. Clark and S. T. Lagerwall (see Appl. Phys. Lett. 36, p 899, 1980).

The presence of the ferroelectric liquid crystals has been announced for the first time in 1975 by R. B. Mayer et al. (see J. Phys., 36, p 69, 1975), and from the viewpoint of structure, these crystals belong to a chiral smectic C phase, a chiral smectic I phase, a chiral smectic F phase, a chiral smectic G phase and a chiral smectic H phase (hereinafter referred to simply as "SC* phase", "SI* phase", "SF* phase", "G* phase" and "SH* phase", respectively).

In the chiral smectic phase, molecules forms a layer and incline to the surface of the layer, and a helical axis is vertical to this layer surface.

In the chiral smectic phase, spontaneous polarization takes place, and therefore, when DC electric field is applied to this layer in parallel therewith, the molecules turn round the helical axis in accordance with its polarity. The display element of the ferroelectric liquid crystals utilizes this switching phenomenon.

Nowadays, of the chiral smectic phases, much attention is particularly paid to the SC* phase.

The display system in which switching phenomenon of the SC* phase is utilized can be further classified into two types: a birefringence type system using two polarizers and a guest/host type system using a dichoric dye.

Features of these display systems are:

(1) Response time is very short.
(2) Memory properties are present.
(3) Display performace is not so affected by visual angle.

Thus, the display systems have the possibility of achieving the high-density display and is considered to be effectively utilizable in the display element. However, also in these display systems, there are now many problems to be solved.

For example, (1) Any compounds are not present which assume the SC* phase which can be stably operated at room temperature.
(2) A helical pitch is short.
(3) The achievement of alignment is very difficult.
(4) Spontaneous polarization is small, and response time is long.

Therefore, typical requirements for the ferroelectric liquid crystal material are as follows:

(1) The SC* phase should be stable in an extensive temperature range inclusive of room temperature.
(2) The helical pitch should be long.
(3) The spontaneous polarization should be large.

At present, any chiral smectic liquid crystal compounds in a single state which satisfy the requirements are not present, and thus one attempt is to provide a ferroelectric liquid crystal composition comprising several chiral smectic liquid crystal compounds or non-liquid crystal compounds which can meet a part of the above-mentioned requirements, after mixing these several compounds and repeating trial and error method.

In addition to the ferroelectric liquid crystal composition comprising the ferroelectric liquid crystal compound alone, Japanese Patent Laid-Open Publication No. 195,187/1986 discloses a ferroelectric liquid crystal composition which can be prepared by mixing one or more compounds assuming a ferroelectric liqiud crystal phase with fundamental materials of compounds and compositions assuming non-chiral smectic C, F, G, H and I phases (hereinafter referred to simply as "SC and other phases").

Furthermore, another ferroelectric liquid crystal composition is also reported in which one or more compounds having optical activity but not assuming any ferroelectric liquid crystal phase are mixed with fundamental materials of compounds and compositions assuming the SC and other phases (Mol. Cryst. Liq. Cryst., 89, p 327, 1982). From these reports, it is definite that the ferroelectric liquid crystal composition can be prepared by mixing one or more compounds having optical activity with fundametal materials irrespectively of whether or not the compounds to be mixed assume the ferroelectric liquid crystal phase.

The above-mentioned smectic liquid crystal mixture which comprises the fundamental material assuming at least one of the non-chiral SC and other phases and which assumes at least one of the SC and other phases will be hereinafter referred to as the base Sm mixture.

The practically preferable base Sm mixture is a liquid crystal mixture assuming the SC phase in an extensive temperature range inclusive of room temperature.

Components of the base Sm mixture, are suitably selected from liquid crystal compounds such as phenylbenzole series, Schiff base series, phenylpyridine series and 5-alkyl-2-(4-alkoxypheny)pyrimidine.

For example, in Japanese Patent Laid-Open Publication No. 291,679/1986 and the pamphlet of PCT International Publication WO86/06401, the ferroelectric liquid crystal prepared by mixing 5-alkyl-2-(4-alkoxyphenyl)pyrimidine with an optically active compound can assume the SC* phase in a wide temperature range inclusive of room temperature., and in the former publication, it is also described that when an optical switching element uses the ferroelectric smectic liquid crystal material in which the above-mentioned pyrimidine derivative is used as the base Sm mixture, thus made switching element can have a shortened response time.

Furthermore, in Japanese Patent Laid-Open Publication No. 291,679/1986, it is disclosed that the ferroelectric liquid crystal material comprising 5-alkyl-2-(4'-alkylbiphenylyl-4)pyrimidine, 5-alkyl-2-(4-alkoxyphenyl)pyrimidine and an optically active compound also assumes the SC* phase in an extensive temperature range including room temperature, and that it is effective for the improvement of the response time.

Also as for helical pitch, some improvements have been made. The ferroelectric liquid crystal material having the long helical pitch can be obtained by mixing a chiral smectic liquid crystal compound in which a helical twist direction is clockwise with a chiral smectic liquid crystal compound in which the helix is twisted counterclockwise, or mixing a compound having the SC phase with a chiral smectic liquid crystal compound (Japanese Patent Laid-Open Publication Nos. 90,290/1985 and 195,187/1986).

The response times of the ferroelectric liquid crystal compositions in Japanese Patent Laid-Open Publication No. 291,679/1986 and the pamphlet of PCT International Publication WO86/06401 are still longer (300 to 500 μsec) as compared with other type display elements such as the presently used light emission type displays, and thus the improvement of the response properties are further demanded.

SUMMARY OF THE INVENTION

A first object of the present invention is to provide a ferroelectric liquid crystal composition having quick response time and assuming an SC* phase in an extensive temperature range inclusive of room temperature, and a second object of the present invention is to provide an optical switching element used this liquid crystal composition and having quick response time.

The first aspect of the present invention is directed to a ferroelectric liquid crystal composition comprising at least one chiral compound having an optical activity site group represented by the general formula (I)

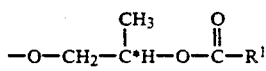
(I)

wherein $R^1$ is a straight-chain or branched alkyl group or alkoxy group having 1 to 18 carbon atoms, and * indicates an asymmetric carbon atom, and at least one non-chiral compound having a smectic C phase, a smectic I phase, a smectic F phase, a smectic G phase, a smectic H phase, a smectic J phase or a smectic K phase.

In the preferable example of the ferroelectric liquid crystal composition, the chiral compound having the optical activity site group represented by the formula (I) is a compound represented by the general formula (II)

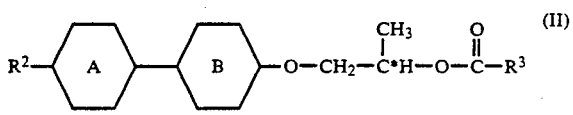
(II)

wherein $R^2$ is a straight-chain or branched alkyl group or alkoxy group having 1 to 18 carbon atoms, $R^3$ is a straight-chain or branched alkyl group or alkoxy group having 1 to 15 carbon atoms, each of

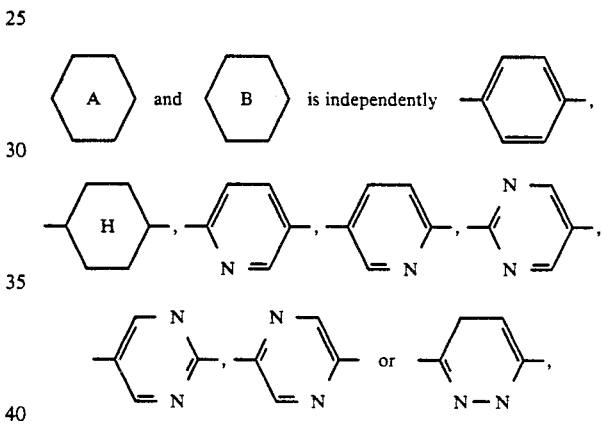

and *indicates an asymmetric carbon atom, and the non-chiral compound having either of a smectic C phase, a smectic I phase, a smectic F phase, a smectic G phase, a smectic H phase, a smectic J phase or a smectic K phase is a compound represented by the general formula (III)

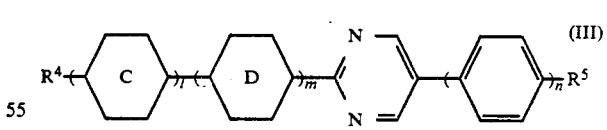
(III)

wherein each of 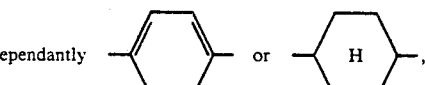 and 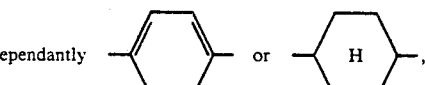 is independantly 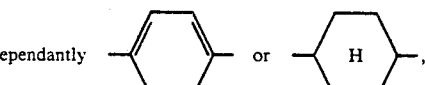, $R^4$ and $R^5$ are identical or different and each of them is an alkyl group, an alkoxy group or an alkanoyloxy group having 1 to 18 carbon atoms, and each of l, m and n is 0 or 1.

Furthermore, the second aspect of the present invention is directed to an optical switching element used the above-mentioned ferroelectric liquid crystal composition.

DETAILED DESCRIPTION OF THE INVENTION

Inventors of the present application have intensively researched with the intention of further improving an invention disclosed in Japanese Patent Laid-Open Publication No. 291,679/1986. As a result, we have found that a ferroelectrical liquid crystal composition having quick response time and assuming an SC* phase in a wide temperature range inclusive of room temperature can be obtained by combining liquid crystal compounds with each other as described hereinafter, and the present invention has been achieved on the basis of this knowledge.

That is, the present invention is directed to a ferroelectric liquid crystal composition containing at least one chiral compound having an optical activity site group represented by the general formula (I)

$$-O-CH_2-\overset{CH_3}{\underset{|}{C^*H}}-O-\overset{O}{\underset{\|}{C}}-R^1 \quad (I)$$

wherein $R^1$ is a straight-chain or branched alkyl group or alkoxy group having 1 to 18 carbon atoms, and * indicates an asymmetric carbon atom, and at least one non-chiral compound having either of a smectic C phase, a smectic I phase, a smectic F phase, a smectic G phase, a smectic H phase, a smectic J phase or a smectic K phase.

In one embodiment of the present invention, the chiral compound having the optical activity site group represented by the formula (I) is a compound represented by the general formula (II)

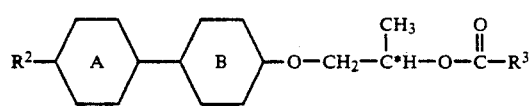

wherein R2 is a straight-chain or branched alkyl group or alkoxy group having 1 to 18 carbon atoms, $R^3$ is a straight-chain or branched alkyl group or alkoxy group having 1 to 15 carbon atoms, each of

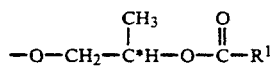

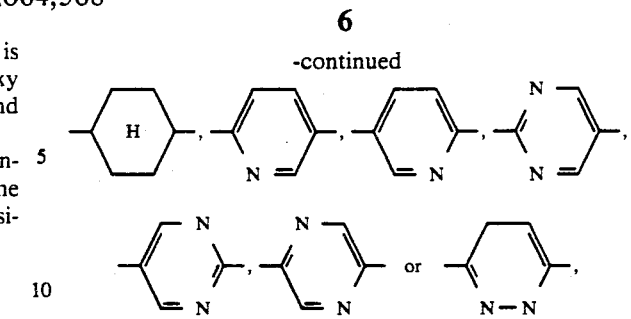

and * indicates an asymmetric carbon atom, and the non-chiral compound having either of a smectic C phase, a smectic I phase, a smectic F phase, a smectic G phase, a smectic H phase, a smectic J phase or a smectic K phase is a compound represented by the general formula (III)

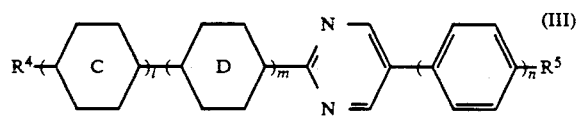

$R^4$ and $R^5$ are identical or different and each of them is a straight-chain or branched alkyl group, an alkoxy group or an alkanoyloxy group having 1 to 18 carbon atoms, and each of (, m and n is 0 or 1. That is, the ferroelectrical liquid crystal composition of the present invention contains at least one compound represented by the general formula (II) and at least one compound represented by the general formula (III).

In another embodiment of the present invention, the ferroelectrical liquid crystal composition comprises a mixture of the following three liquid crystal components A, B and C, and the ratio of these components being 20 to 75% by weight of A, 5 to 30% by weight of B and 5 to 35% by weight of C with respect to the total weight of the three components. Here, the liquid crystal component A comprises one or more selected from the group consisting of a compound represented by the general formula (IV)

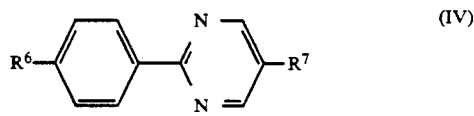

wherein $R^6$ and $R^7$ are identical or different and each of them is respectively an alkyl group or an alkoxy group having 1 to 18 carbon atoms, a compound represented by the general formula (V)

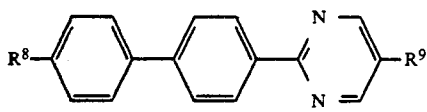

(V)

wherein $R^8$ and $R^9$ are identical or different and each of them is respectively an alkyl group or an alkoxy group having 1 to 18 carbon atoms, a compound represented by the general formula (VI)

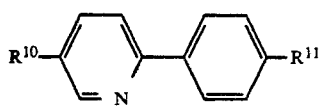

(VI)

wherein $R^{10}$ and $R^{11}$ are identical or different and each of them is respectively an alkyl group or an alkoxy group having 1 to 18 carbon atoms, and a compound represented by the general formula (VII)

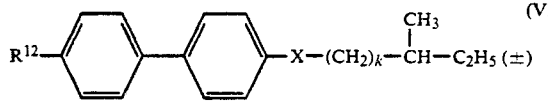

(VII)

wherein $R^{12}$ is an alkyl group or an alkoxy group having 1 to 18 carbon atoms, X is no group, that is single bond, or an oxygen atom, k is in the range of 0 to 10, and (±) represents a racemic compound.

The liquid crystal component B comprises one or more of compounds represented by the general formula (VIII)

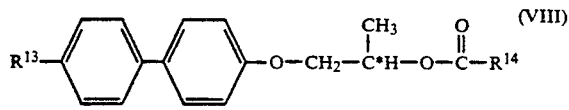

(VIII)

wherein $R^{13}$ and $R^{14}$ are identical or different and each of them is respectively an alkyl group or an alkoxy group having 1 to 18 carbon atoms, and * indicates an asymmetric carbon atom.

The liquid crystal component C comprises one or more of compounds represented by the general formula (IX)

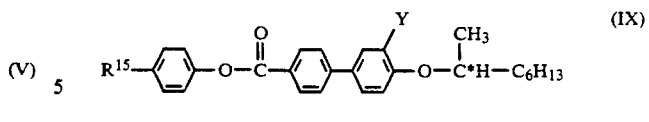

(IX)

wherein $R^{15}$ is an alkyl group or an alkoxy group having 1 to 18 carbon atoms, Y is H, F or CN, and * indicates an asymmetric carbon atom.

In still another embodiment of the present invention, the ferroelectric liquid crystal composition contains the following liquid crystal component D in addition to the above-mentioned three components A, B and C, the content of the component D being 5 to 25% by weight based on the total weight of the three components A, B and C.

The liquid crystal component D comprises one or more selected from the group consisting of a compound represented by the general formula (X)

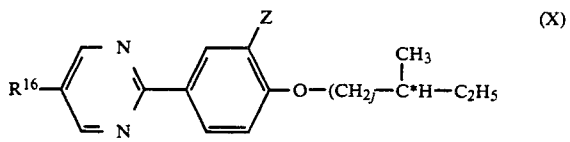

(X)

wherein $R^{16}$ is an alkyl group or an alkoxy group having 1 to 18 carbon atoms, Z is H, F or CN, j is in the range of 0 to 10, and * indicates an asymmetric carbon atom, a compound represented by the general formula (XI)

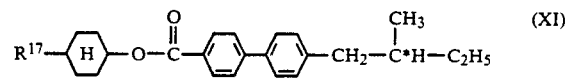

(XI)

wherein $R^{17}$ is an alkyl group having 1 to 18 carbon atoms, and * indicates an asymmetric carbon atom, a compound represented by the general formula (XII)

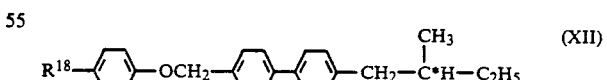

(XII)

wherein $R^{18}$ is an alkyl group or an alkoxy group having 1 to 18 carbon atoms, and * indicates an asymmetric carbon atom, and a compound represented by the general formula (XIII)

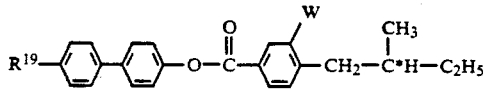

(XIII)

wherein $R^{19}$ is an alkyl group or an alkoxy group having 1 to 18 carbon atoms, W is H, F or CN, and * indicates an asymmetric carbon atom.

Moreover, the present invention is directed to optical switching elements used the above-mentioned various ferroelectric liquid crystal compositions.

As the compound having the optical activity site group represented by the general formula (I) used in the present invention, ester derivaties of omega-substituted optically active 2-alkanols represented by the general formula (II) which the applicant of the present case has already filed for patent are particularly preferable (Japanese Patent Application No. 133,269/1986 which is now unrevealed).

Needless to say, the compounds having the optical activity site groups represented by the general formula (I) can be employed for the preparation of the ferroelectric liquid crystal composition of the present invention, even though they deviate from the general formula (II), and examples of such compounds include compounds having intermediate groups such as —C(O)—O—, —CH=N—, —CH₂O—, —N=N—,

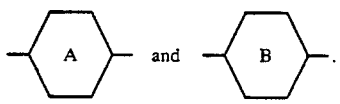

—OC(O)—, —N=CH— and —OCH₂— between

Typical compounds represented by the general formula (II) are set forth in Tables 1 to 6 given below.

In the preparation of the ferroelectric liquid crystal composition of the present invention, 4'-alkoxy (or alkyl)-4-(2'-alkoxy (or alkyl)-carbonyloxypropoxy)biphenyl compound, which is the liquid crystal component B, represented by the general formula (VIII) is preferably used, but other compounds (e.g., compounds shown in Tables 2 to 6) may be employed, of course, as constitutional components of the ferroelectric liquid crystal composition of the present invention.

TABLE 1

Compounds represented by

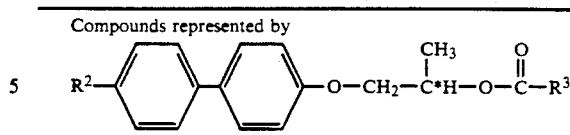

wherein $R^2$ and $R^3$ are as follows:

| $R^2$ | $R^3$ | $R^2$ | $R^3$ |
|---|---|---|---|
| $C_6H_{13}O-$ | $-C_3H_7$ | $C_5H_{11}-$ | $-C_3H_7$ |
| " | $-C_5H_{11}$ | " | $-C_4H_9$ |
| " | $-C_6H_{13}$ | " | $-C_5H_{11}$ |
| " | $-C_8H_{17}$ | " | $-C_6H_{13}$ |
| $C_8H_{17}O-$ | $-CH_3$ | $C_7H_{15}-$ | $-C_4H_9$ |
| " | $-C_2H_5$ | " | $-C_5H_{11}$ |
| " | $-C_3H_7$ | " | $-C_7H_{15}$ |
| " | $-C_4H_9$ | $C_8H_{17}-$ | $-C_2H_5$ |
| " | $-C_5H_{11}$ | " | $-C_3H_7$ |
| " | $-C_6H_{13}$ | " | $-C_5H_{11}$ |
| " | $-C_7H_{15}$ | " | $-C_7H_{15}$ |
| $C_{11}H_{23}O-$ | $-C_2H_5$ | $C_6H_{13}O-$ | $-CH_2CH(CH_3)-CH_3$ |
| " | $-C_4H_9$ | $C_8H_{17}O-$ | " |
| " | $-C_6H_{13}$ | " | $-C_2H_5CH(CH_3)-CH_3$ |
| " | $-C_7H_{15}$ | $C_{11}H_{23}O-$ | $-CH_2CH(CH_3)-CH_3$ |

TABLE 2

Compounds represented by

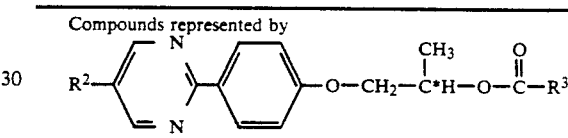

wherein $R^2$ and $R^3$ are as follows:

| $R^2$ | $R^3$ | $R^2$ | $R^3$ |
|---|---|---|---|
| $C_8H_{17}-$ | $-C_3H_7$ | $C_8H_{17}-$ | $-C_6H_{13}$ |
| " | $-C_4H_9$ | | |

TABLE 3

Compounds represented by

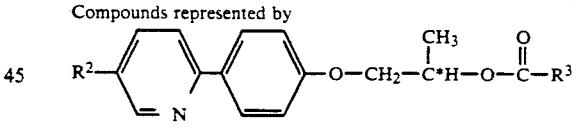

wherein $R^2$ and $R^3$ are as follows:

| $R^2$ | $R^3$ | $R^2$ | $R^3$ |
|---|---|---|---|
| $C_9H_{19}-$ | $-C_3H_7$ | $C_9H_{19}-$ | $-C_6H_{13}$ |
| " | $-C_4H_9$ | | |

TABLE 4

Compounds represented by

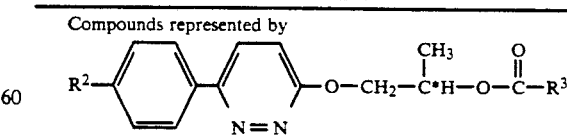

wherein $R^2$ and $R^3$ are as follows:

| $R^2$ | $R^3$ | $R^2$ | $R^3$ |
|---|---|---|---|
| $C_9H_{19}-$ | $-C_2H_5$ | $C_8H_{17}O-$ | $-C_3H_7$ |
| " | $-C_4H_9$ | " | $-C_4H_9$ |
| " | $-C_5H_{11}$ | " | $-C_6H_{13}$ |

TABLE 5

Compounds represented by

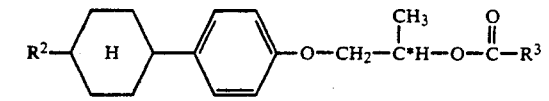

wherein $R^2$ and $R^3$ are as follows:

| $R^2$ | $R^3$ | $R^2$ | $R^3$ |
|---|---|---|---|
| $C_5H_{11}-$ | $-C_3H_7$ | $C_5H_{11}-$ | $-C_5H_{11}$ |

TABLE 6

Compounds represented by

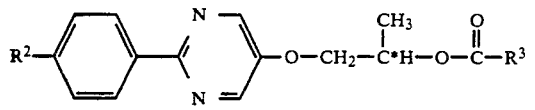

wherein $R^2$ and $R^3$ are as follows:

| $R^2$ | $R^3$ | $R^2$ | $R^3$ |
|---|---|---|---|
| $C_8H_{17}-$ | $-C_3H_7$ | $C_8H_{17}-$ | $-C_6H_{13}$ |
| " | $-C_4H_9$ | " | $-CH_2CH(CH_3)-CH_3$ |
| " | $-C_5H_{11}$ | $C_8H_{17}O-$ | $-C_4H_7$ |

TABLE 7

Compounds represented by

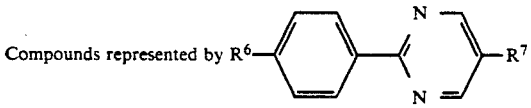

wherein $R^6$ and $R^7$ are as follows:

| $R^6$ | $R^7$ | $R^6$ | $R^7$ |
|---|---|---|---|
| $C_6H_{13}O-$ | $C_8H_{17}-$ | $C_9H_{19}O-$ | $-C_{10}H_{21}-$ |
| " | $C_9H_{19}-$ | $C_{10}H_{21}O-$ | $C_8H_{17}-$ |
| " | $C_{10}H_{21}-$ | $C_{11}H_{23}O-$ | $C_7H_{15}-$ |
| " | $C_{11}H_{23}-$ | " | $C_8H_{17}-$ |
| $C_7H_{15}O-$ | $C_9H_{19}-$ | $C_{12}H_{25}O-$ | $C_7H_{15}-$ |
| " | $C_{10}H_{21}-$ | " | $C_8H_{17}-$ |
| " | $C_{11}H_{23}-$ | $C_5H_{11}COO-$ | " |
| $C_8H_{17}O-$ | $C_8H_{17}-$ | $C_6H_{13}COO-$ | " |
| " | $C_9H_{19}-$ | $C_7H_{15}COO-$ | " |
| " | $C_{10}H_{21}-$ | $C_8H_{17}COO-$ | " |
| " | $C_{11}H_{23}-$ | $C_9H_{19}COO-$ | " |
| $C_9H_{19}O-$ | $C_7H_{15}-$ | $C_{10}H_{21}COO-$ | " |
| " | $C_8H_{17}-$ | $C_{11}H_{23}COO-$ | " |
| " | $C_9H_{19}-$ | | |

On the other hand, the non-chiral compounds represented by the general formula (III) are very useful as base SC compounds because of having the SC and other phases and fairly low viscosity, and several non-chiral pyrimidine derivatives of these compounds are used to obtain a base Sm mixture. The usefulness of the non-chiral compound is described in Japanese Patent Laid-open Publication No. 291,679/1986 in which inventors are the same as in this application, and the non-chiral compound plays a very important role as the component of the ferroelectric liquid crystal composition which the present invention aims at.

Of the non-chiral compounds represented by the general formula (III), their typical examples which can assume the SC and other phases are set forth in Tables 7 to 9. In the ferroelectric liquid crystal composition of the present invention, phenylpyrimidine series compounds represented by the general formula (IV) and biphenylpyrimidine series compounds represented by the general formula (V), which are the liquid crystal component A, are used particularly preferably, but other compounds (e.g., compounds shown in Table 8) may be used as the constitutional components of the ferroelectric liquid crystal composition of the present invention.

TABLE 8

Compounds represented by

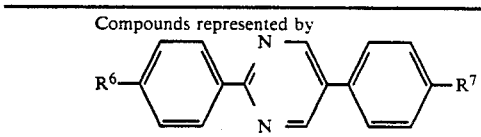

wherein $R^6$ and $R^7$ are as follows:

| $R^6$ | $R^7$ | $R^6$ | $R^7$ |
|---|---|---|---|
| $C_4H_9O-$ | $C_4H_9O-$ | $C_9H_{19}O-$ | $C_9H_{19}O-$ |
| $C_5H_{11}O-$ | $C_5H_{11}O-$ | $C_{10}H_{21}O-$ | $C_{10}H_{21}O-$ |
| $C_6H_{13}O-$ | $C_6H_{13}O-$ | $C_{11}H_{23}O-$ | $C_{11}H_{23}O-$ |
| $C_7H_{15}O-$ | $C_7H_{15}O-$ | $C_{12}H_{25}O-$ | $C_{12}H_{25}O-$ |
| $C_8H_{17}O-$ | $C_8H_{17}O-$ | $C_{14}H_{29}O-$ | $C_{14}H_{29}O-$ |
| $C_4H_9-$ | $C_4H_9O-$ | $C_6H_{13}-$ | $C_5H_{11}O-$ |
| " | $C_5H_{11}O-$ | " | $C_6H_{13}O-$ |
| " | $C_6H_{13}O-$ | " | $C_7H_{15}O-$ |
| " | $C_7H_{15}O-$ | " | $C_8H_{17}O-$ |
| " | $C_8H_{17}O-$ | " | $C_9H_{19}O-$ |
| " | $C_9H_{19}O-$ | " | $C_{10}H_{21}O-$ |
| " | $C_{10}H_{21}O-$ | " | $C_{12}H_{25}O-$ |
| " | $C_{11}H_{23}O-$ | " | $C_{14}H_{29}O-$ |
| " | $C_{12}H_{25}O-$ | $C_7H_{15}-$ | $C_5H_{11}O-$ |
| " | $C_{14}H_{29}O-$ | " | $C_6H_{13}O-$ |
| $C_5H_{11}-$ | $C_5H_{11}O-$ | " | $C_7H_{15}O-$ |
| " | $C_6H_{13}O-$ | " | $C_8H_{17}O-$ |
| " | $C_7H_{15}O-$ | " | $C_9H_{19}O-$ |
| " | $C_8H_{17}O-$ | " | $C_{10}H_{21}O-$ |
| " | $C_9H_{19}O-$ | " | $C_{12}H_{25}O-$ |
| $C_5H_{11}-$ | $C_{10}H_{21}O-$ | $C_7H_{15}-$ | $C_{14}H_{29}O-$ |
| " | $C_{12}H_{25}O-$ | $C_8H_{17}-$ | $C_5H_{11}O-$ |
| " | $C_{14}H_{29}O-$ | " | $C_6H_{13}O-$ |
| $C_8H_{17}-$ | $C_7H_{15}O-$ | $C_{10}H_{21}-$ | $C_9H_{19}O-$ |
| " | $C_8H_{17}O-$ | " | $C_{10}H_{21}O-$ |
| " | $C_9H_{19}O-$ | " | $C_{12}H_{25}O-$ |
| " | $C_{10}H_{21}O-$ | " | $C_{14}H_{29}O-$ |
| " | $C_{12}H_{25}O-$ | $C_{12}H_{25}-$ | $C_5H_{11}O-$ |
| " | $C_{14}H_{29}O-$ | " | $C_6H_{13}O-$ |
| $C_9H_{19}-$ | $C_5H_{11}O-$ | " | $C_7H_{15}O-$ |
| " | $C_6H_{13}O-$ | " | $C_8H_{17}O-$ |
| " | $C_7H_{15}O-$ | " | $C_9H_{19}O-$ |
| " | $C_8H_{17}O-$ | " | $C_{10}H_{21}O-$ |
| " | $C_9H_{19}O-$ | " | $C_{12}H_{25}O-$ |
| " | $C_{10}H_{21}O-$ | " | $C_{14}H_{29}O-$ |
| " | $C_{12}H_{25}O-$ | $C_5H_{11}O-$ | $C_5H_{11}-$ |
| " | $C_{14}H_{29}O-$ | " | $C_6H_{13}-$ |

TABLE 8-continued

Compounds represented by

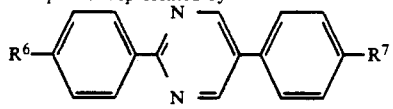

wherein $R^6$ and $R^7$ are as follows:

| $R^6$ | $R^7$ | $R^6$ | $R^7$ |
|---|---|---|---|
| $C_{10}H_{21}-$ | $C_5H_{11}O-$ | " | $C_7H_{15}-$ |
| " | $C_6H_{13}O-$ | " | $C_8H_{17}-$ |
| " | $C_7H_{15}O-$ | " | $C_9H_{19}-$ |
| " | $C_8H_{17}O-$ | " | $C_{10}H_{21}-$ |
| $C_5H_{11}O-$ | $C_{12}H_{25}-$ | $C_8H_{17}O-$ | $C_5H_{11}-$ |
| " | $C_{14}H_{29}-$ | " | $C_6H_{13}-$ |
| $C_6H_{13}O-$ | $C_5H_{11}-$ | $C_8H_{17}O-$ | $C_7H_{15}-$ |
| " | $C_6H_{13}-$ | " | $C_8H_{17}-$ |
| " | $C_7H_{15}-$ | " | $C_9H_{19}-$ |
| " | $C_8H_{17}-$ | " | $C_{10}H_{21}-$ |
| " | $C_9H_{19}-$ | " | $C_{12}H_{25}-$ |
| " | $C_{10}H_{21}-$ | " | $C_{14}H_{29}-$ |
| " | $C_{12}H_{25}-$ | $C_9H_{19}O-$ | $C_5H_{11}-$ |
| " | $C_{14}H_{29}-$ | " | $C_6H_{13}-$ |
| $C_7H_{15}O-$ | $C_5H_{11}-$ | " | $C_7H_{15}-$ |
| " | $C_6H_{13}-$ | " | $C_8H_{17}-$ |
| " | $C_7H_{15}-$ | " | $C_9H_{19}-$ |
| " | $C_8H_{17}-$ | " | $C_{10}H_{21}-$ |
| " | $C_9H_{19}-$ | " | $C_{12}H_{25}-$ |
| " | $C_{10}H_{21}-$ | " | $C_{14}H_{29}-$ |
| " | $C_{12}H_{25}-$ | $C_{10}H_{21}O-$ | $C_5H_{11}-$ |
| " | $C_{14}H_{29}-$ | " | $C_6H_{13}-$ |
| $C_{10}H_{21}O-$ | $C_7H_{15}-$ | $C_{12}H_{25}O-$ | $C_{10}H_{21}-$ |
| " | $C_8H_{17}-$ | " | $C_{12}H_{25}-$ |
| " | $C_9H_{19}-$ | " | $C_{14}H_{29}-$ |
| " | $C_{10}H_{21}-$ | $C_{14}H_{29}O-$ | $C_5H_{11}-$ |
| " | $C_{12}H_{25}$ | " | $C_6H_{13}-$ |
| " | $C_{14}H_{29}-$ | " | $C_7H_{15}-$ |
| $C_{12}H_{25}O-$ | $C_5H_{11}-$ | " | $C_8C_{17}-$ |
| $C_{12}H_{25}O-$ | $C_6H_{13}-$ | $C_{14}H_{29}O-$ | $C_9H_{19}-$ |
| " | $C_7H_{15}-$ | " | $C_{10}H_{21}-$ |
| " | $C_8H_{17}-$ | " | $C_{12}H_{25}-$ |
| " | $C_9H_{19}-$ | " | $C_{14}H_{29}-$ |

TABLE 9

Compounds represented by

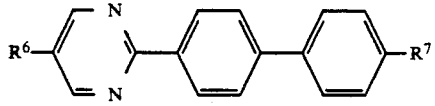

wherein $R^6$ and $R^7$ are as follows:

| $R^6$ | $R^7$ | $R^6$ | $R^7$ |
|---|---|---|---|
| $C_4H_9-$ | $C_4H_9O-$ | $C_4H_9-$ | $C_8H_{17}O-$ |
| " | $C_5H_{11}O-$ | " | $C_9H_{19}O-$ |
| " | $C_6H_{13}O-$ | " | $C_{10}H_{21}O-$ |
| " | $C_7H_{15}O-$ | " | $C_{11}H_{23}O-$ |
| $C_4H_9-$ | $C_{12}H_{25}O-$ | $C_7H_{15}-$ | $C_5H_{11}O-$ |
| " | $C_{14}H_{29}O-$ | " | $C_6H_{13}O-$ |
| $C_5H_{11}-$ | $C_5H_{11}O-$ | " | $C_7H_{15}O-$ |
| " | $C_6H_{13}O-$ | " | $C_8H_{17}O-$ |
| " | $C_7H_{15}O-$ | " | $C_9H_{19}O-$ |
| " | $C_8H_{17}O-$ | " | $C_{10}H_{21}O-$ |
| " | $C_9H_{19}O-$ | " | $C_{12}H_{25}O-$ |
| " | $C_{10}H_{21}O-$ | " | $C_{14}H_{29}O-$ |
| " | $C_{12}H_{25}O-$ | $C_8H_{17}-$ | $C_5H_{11}O-$ |
| " | $C_{14}H_{29}O-$ | " | $C_6H_{13}O-$ |
| $C_6H_{13}-$ | $C_5H_{11}O-$ | " | $C_7H_{15}O-$ |

TABLE 9-continued

Compounds represented by

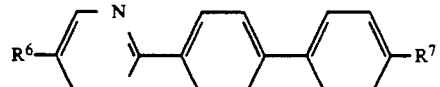

wherein $R^6$ and $R^7$ are as follows:

| $R^6$ | $R^7$ | $R^6$ | $R^7$ |
|---|---|---|---|
| " | $C_6H_{13}O-$ | " | $C_8H_{17}O-$ |
| " | $C_7H_{15}O-$ | " | $C_9H_{19}O-$ |
| " | $C_8H_{17}O-$ | " | $C_{10}H_{21}O-$ |
| $C_6H_{13}-$ | $C_9H_{19}O-$ | " | $C_{12}H_{25}O-$ |
| " | $C_{10}H_{21}O-$ | " | $C_{14}H_{29}O-$ |
| $C_6H_{13}-$ | $C_{12}H_{25}O-$ | $C_9H_{19}-$ | $C_5H_{11}O-$ |
| " | $C_{14}H_{29}O-$ | " | $C_6H_{13}O-$ |
| $C_9H_{19}-$ | $C_7H_{15}O-$ | $C_{12}H_{25}-$ | $C_9H_{19}O-$ |
| " | $C_8H_{17}O-$ | " | $C_{10}H_{21}O-$ |
| " | $C_9H_{19}O-$ | " | $C_{12}H_{25}O-$ |
| " | $C_{10}H_{21}O-$ | " | $C_{14}H_{29}O-$ |
| " | $C_{12}H_{25}O-$ | $C_5H_{11}-$ | $C_5H_{11}-$ |
| " | $C_{14}H_{29}O-$ | " | $C_6H_{13}-$ |
| $C_{10}H_{21}-$ | $C_5H_{11}O-$ | " | $C_7H_{15}-$ |
| " | $C_6H_{13}O-$ | " | $C_8H_{17}-$ |
| " | $C_7H_{15}O-$ | " | $C_9H_{19}-$ |
| " | $C_8H_{17}O-$ | " | $C_{10}H_{21}-$ |
| " | $C_9H_{19}O-$ | " | $C_{12}H_{25}-$ |
| " | $C_{10}H_{21}O-$ | " | $C_{14}H_{29}-$ |
| " | $C_{12}H_{25}O-$ | $C_6H_{13}-$ | $C_5H_{11}-$ |
| " | $C_{14}H_{29}O-$ | " | $C_6H_{13}-$ |
| $C_{12}H_{25}-$ | $C_5H_{11}O-$ | " | $C_7H_{15}-$ |
| " | $C_6H_{13}O-$ | " | $C_8H_{17}-$ |
| " | $C_7H_{15}O-$ | " | $C_9H_{19}-$ |
| " | $C_8H_{17}O-$ | " | $C_{10}H_{21}-$ |
| $C_6H_{13}-$ | $C_{12}H_{25}-$ | $C_9H_{19}-$ | $C_5H_{11}-$ |
| " | $C_{14}H_{29}-$ | $C_9H_{19}-$ | $C_6H_{13}$ |
| $C_7H_{15}-$ | $C_5H_{11}-$ | " | $C_7H_{15}-$ |
| $C_7H_{15}-$ | $C_6H_{13}-$ | $C_9H_{19}-$ | $C_8H_{17}-$ |
| " | $C_7H_{15}-$ | " | $C_9H_{19}-$ |
| " | $C_8H_{17}-$ | " | $C_{10}H_{21}-$ |
| " | $C_9H_{19}-$ | " | $C_{12}H_{25}-$ |
| " | $C_{10}H_{21}-$ | " | $C_{14}H_{29}-$ |
| " | $C_{12}H_{25}-$ | $C_{10}H_{21}-$ | $C_5H_{11}-$ |
| " | $C_{14}H_{29}-$ | " | $C_6H_{13}-$ |
| $C_8H_{17}-$ | $C_5H_{11}-$ | " | $C_7H_{15}-$ |
| " | $C_6H_{13}-$ | " | $C_8H_{17}-$ |
| " | $C_7H_{15}-$ | " | $C_9H_{19}-$ |
| " | $C_8H_{17}-$ | " | $C_{10}H_{21}-$ |
| " | $C_9H_{19}-$ | " | $C_{12}H_{25}-$ |
| " | $C_{10}H_{21}-$ | " | $C_{14}H_{29}-$ |
| " | $C_{12}H_{25}-$ | $C_{12}H_{25}-$ | $C_5H_{11}-$ |
| " | $C_{14}H_{29}-$ | " | $C_6H_{13}-$ |
| $C_{12}H_{25}-$ | $C_7H_{15}-$ | $C_{14}H_{29}-$ | $C_5H_{11}-$ |
| " | $C_8H_{17}-$ | " | $C_6H_{13}-$ |
| " | $C_9H_{19}-$ | " | $C_7H_{15}-$ |
| " | $C_{10}H_{21}-$ | " | $C_8H_{17}-$ |
| " | $C_{12}H_{25}-$ | " | $C_9H_{19}-$ |
| " | $C_{14}H_{29}-$ | " | $C_{10}H_{21}-$ |
| | | " | $C_{12}H_{25}-$ |
| | | " | $C_{14}H_{29}-$ |

The base Sm mixture in the ferroelectric liquid crystal composition regarding the present invention can be prepared by combining plural compounds alone having the SC phase enumerated in Tables 7 to 9, and it is also possible to combine one or more of these compounds with one or more of known non-chiral compounds in a range in which the object of the present invention is not damaged.

Examples of the known non-chiral compounds include biphenylbenzoate series, biphenylcyclohexane series, azo series, azoxy series, phenylpyridine series and biphenyl series liquid crystal compounds which are rich in smectic C properties. Of these compounds, the phenylpyridine series compounds of the general formula (VI) and the biphenyl series compounds of the general formula (VII) are preferably used in order to obtain the excellent base Sm compounds by the combination with the pyrimidine derivatives of the general formula (III) or mixtures thereof.

Of the phenylpyridine series compounds represented by the general formula (VI), particularly preferable are 2-(4'-alkoxyphenyl)-5-alkylpyridine compounds having the SC phase in which $R^{10}$ in the formula (VI) is an alkyl group having 7 to 10 carbon atoms and $R^{11}$ is an alkoxy group having 4 to 12 carbon atoms. Furthermore, of the biphenyl series compounds represented by the general formula (VII), particularly preferable are compounds having the SC phase in which $R^{12}$ in the formula (VII) is an alkoxy group having 7 to 10 carbon atoms, X is no group, and k is 3.

The pyrimidine series compound represented by the formula (IV) or (V) which are used as the component of the ferroelectric liquid crystal composition regarding the present invention, preferably has the SC phase as described above, but compounds which do not assume the SC phase can be also used only in such amounts as not to noticeably decrease an SC phase temperature range of the obtained base Sm mixture.

This fact can be applied to the phenylpyridine series compounds and the biphenyl series compounds assuming no SC phase which are represented by the formulae (VI) and (VII), and these compounds can be used with the intentions of lowering viscosity and regulating the SC phase temperature range.

The ferroelectric liquid crystal composition of the present invention can be prepared, as described above, by mixing the chiral compound represented by the general formula (II) [which is mainly the liquid crystal component B and the typical example of which is a compound represented by the general formula (VIII)]- with the non-chiral pyrimidine series compound having the general formula (III) [which is mainly the liquid crystal component A and the typical example of which is a compound represented by the general formula (IV) or (V)]. In other embodiments, the ferroelectric liquid crystal composition having very excellent characteristics can be also obtained by combining the compound represented by the general formula (VI) or (VII) which is the liquid crystal component A with the compound having the general formula (IX) which is the liquid crystal component C or the compound having the general formula (X), (XI), (XII) or (XIII) which is the liquid crystal component D.

Most of compounds having the liquid crystal characteristics which are represented by the general formulae (VI), (VII) and (IX) to (XIII) are known, and they are already disclosed in, for example, Japanese Patent Laid-Open Publication Nos. 43/1986, 210,056/1986, 169,765/1987, 63,633/1986, 13,729/1985 and 122,334/1981. Furthermore, most of the other liquid crystal compounds are disclosed in, for example, Japanese Patent Application Nos. 053,778/1987 and 192,516/1986 where the applicant is the same as in this case.

The present invention is directed to the liquid crystal composition which fundamentally contains the chiral compound having the optical activity site group represented by the general formula (I) and the non-chiral compound assuming the SC and other phases, but concretely speaking, it is based on the mutual combination of the liquid crystal compounds represented by the general formulae (IV) to (XIII) having excellent characteristics. Next, reference to the excellent characteristics of the respective liquid crystal components will be made.

The compounds represented by the general formulae (IV), (V), (VI) and (VII) which are the liquid crystal component A are non-chiral and play the role of the base SC compound in the present invention.

The compound represented by the formula (IV) has the SC phase in a low-temperature region (e.g., in the case that $R^6=C_6H_{13}O—$ and $R^7=C_8H_{17}—$, Cr28SC47SA58N66ISO wherein Cr denotes crystals, N a nematic phase and ISO an isotropic liquid), whereas the compound represented by the formula (V) has the SC phase in a high-temperature region (e.g., in the case that $R^8=C_7H_{15}—$ and $R^9=C_8H_{17}—$, Cr58SC134SA144N157-ISO).

Thus, when the compound represented by the general formula (IV) is combined with the compound represented by the general formula (V), the base SC mixture can be obtained which has the SC phase in the extensive temperature region ranging from a low level to a high level.

As described in Japanese Patent Laid-Open Publication No. 291,679/1986 of the same inventors as in this case, these compounds have excellent characteristics, e.g., very low viscosity, and therefore they play the important role as the base SC components in the ferroelectric liquid crystal composition regarding the present invention.

On the other hand, the compound represented by the general formula (VI) has the SC and other phases in the wide temperature region ranging from a low level to a high level (e.g., in the case that $R^{10}=C_7H_{15}—$ and $R^{11}=C_7H_{15}O—$, Cr24SH32SG40SF53SC77ISO), and the compound represented by the general formula (VII) has the SC and other phases in a low-temperature region (e.g., in the case that $R^{12}=C_7H_{15}O—$, X=no group and k=3, Cr20SG40SF51SC53ISO).

As described in EP 0206228 of the same inventors as in this case, these compounds have excellent characteristics, e.g., very low viscosity like the above-mentioned pyrimidine series compound, and thus they play the role of the base SC compound in the ferroelectric liquid crystal composition of the present invention and has the intention of regulating an SC phase temperature range.

The compounds represented by the general formulae (IV) to (VII) which are the liquid crystal component A play the role of the base SC compound in the present invention, and therefore the concentration of the liquid crystal component A is desirably 75% by weight or less.

When the concentration of the liquid crystal component A is less than 20% by weight, it is difficult to maintain the SC layer.

The compounds represented by the general formula (VIII) which are the liquid crystal component B are chiral compounds, and they are described in the prior application, i.e., Japanese Patent Application No. 133,269/1986 (unrevealed) of the same applicant as in this case.

The liquid crystal component B plays the important role of realizing high response in the ferroelectric liquid crystal composition, and it has a great spontaneous polarization value (extrapolation value=80 nC/cm$^2$) and very excellent responsiveness.

For the confirmation of the above fact, an experiment was carried out. A compound (melting point=76° C.) represented by the formula (VIII) wherein $R^{13}=C_8H_{17}O-$ and $R^{14}=C_4H_9-$ was added, in an amount of 20% by weight, to a base SC composition A (phase transition temperature; Cr16SC78SA84N1-15ISO) which was composed of non-chiral pyridine series liquid crystal compounds represented by the general formulae (IV) and (V) of the present invention, in order to prepare a ferroelectric liquid crystal composition B.

This ferroelectric liquid crystal composition B assumed an SC* phase in a temperature region of 20° to 58° C., an SA phase on the side of a higher temperature thereof, an N* phase (cholesteric phase) at 77° C., and an isotropic liquid at 93° C.

The spontaneous polarization value of the composition B at 25° C. was great, 15.6 nC/cm$^2$, and its tilt angle was 13 degrees and its response time was 60 μsec ($E=\pm 5V/\mu m$).

As is apparent from the foregoing, it has been found that the ferroelectric liquid crystal composition having very high responsiveness can be obtained by mixing the chiral compound represented by the formula (VIII) with the non-chiral compound having the formula (IV) or (V).

Composition A:

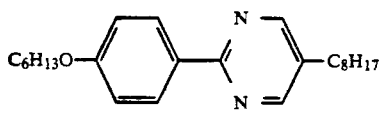  20% by weight

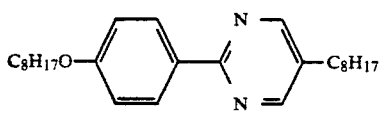  10% by weight

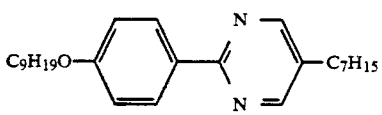  3% by weight

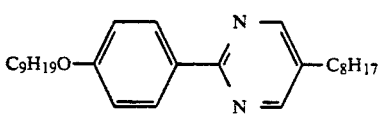  5% by weight

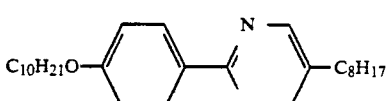  5% by weight

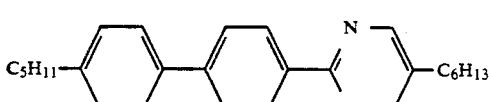  19% by weight

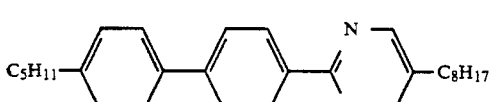  13% by weight

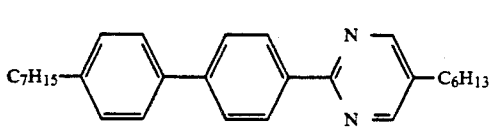  25% by weight

Composition B:
Composition A (base SC composition)  80% by weight

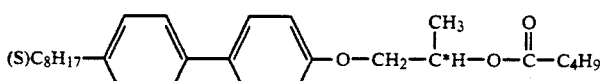  20% by weight

The liquid crystal component B plays the important role of providing the high responsiveness, but when the amount of the component B is used excessively, the temperature range of the SC* phase tends to narrow Thus, the concentration of the liquid crystal component B is suitably 30% by weight or less.

Furthermore, when the liquid crystal component B is less than 5% by weight, the noticeable improvement of the responsiveness cannot be perceived unpreferably.

In the case that the absolute configuration of the optical activity site was S type, the direction of the spontaneous polarization of this compound was − type, and the twist direction of its helix was left.

(In the case that the absolute configuration was R type, they were + type and right.)

The compound represented by the general formula (IX) which is the liquid crystal component C is a chiral compound, and it assumes the SC* phase in a high-temperature range, and has a great tilt angle and a very great spontaneous polarization value.

For example, when in the formula (IX), $R^{15}$ is $C_8H_{17}O$-and Y is F, a phase transition temperature is Cr52SC*104N*-109ISO, a tilt angle is 34.5 degrees, and Ps is 132 nC/cm$^2$ (T-Tc=−30° C.), when $R^{15}$ is $C_6H_{13}O$— and Y is H, a phase transition temperature is Cr71SC*98N*123ISO, a tilt angle is 38.1 degrees, and Ps is 110 nC/cm$^2$ (T-Tc=−30° C.), and when $R^{15}$ is $C_8H_{17}O$— and Y is CN, a phase transition temperature is Cr28SC*57SA94ISO, a tilt angle is 25 degrees, and Ps is 240 nC/cm$^2$ (T-Tc=−30° C.).

In the ferroelectric liquid crystal composition of the present invention, therefore, the liquid crystal component C plays important roles such as the enhancement of responsiveness, the improvement of tilt angle and the elevation of the upper limit temperature of the SC* phase.

For example, the above-mentioned ferroelectric liquid crystal composition B is indeed very excellent in responsiveness, but a low-temperature region for its SC* phase is insufficient from a practical viewpoint (its lower limit is required to be at least 0° C. or less), and its tilt angle is also small. In consequence, the composition B alone is not considered to be practical. The ideal tilt angle is 22.5 or 45 degrees, but the practical tilt angle is in the range of 16 to 29 degrees or 30 to 60 degrees (see Japanese Patent Laid-Open No. 106,985/1987).

For investigations of these properties, an experiment was carried out. Compounds in which in the formula (IX), Y=F and $R^{15}=C_6H_{13}$—, $C_7H_{15}$— and $C_8H_{17}$— were added, in amounts of 10% by weight, 5% by weight and 5% by weight, respectively, to this composition B in order to prepare a ferroelectric liquid crystal composition C.

| Composition C: | |
|---|---|
| Composition B | 80% by weight |
| (S)C$_6$H$_{13}$—〇—O—C(=O)—〇—〇(F)—O—CH*C$_6$H$_{13}$ (CH$_3$) | 10% by weight |
| (S)C$_7$H$_{15}$—〇—O—C(=O)—〇—〇(F)—O—CH*C$_6$H$_{13}$ (CH$_3$) | 5% by weight |
| -continued Composition C: | |
| (S)C$_8$H$_{17}$—〇—O—C(=O)—〇—〇(F)—O—CH*C$_6$H$_{13}$ (CH$_3$) | 5% by weight. |

This ferroelectric liquid crystal composition C assumed an SC* phase in a temperature range of −7° to 65° C., an SA phase on the side of a higher temperature thereof, an N* phase at 73° C., and an isotropic liquid at 85° C. The spontaneous polarization value of the composition C at 25° C. was 21.7 nC/cm$^2$, and its tilt angle was 25 degrees and its response time was 80 μsec (E=±5V/μm).

The response time of the composition C is slightly inferior to that of the composition B but is much shorter than in the ferroelectric liquid crystal compositions disclosed in Japanese Patent Laid-Open No. 291,679/1986 and the pamphlet of PCT International Publication W086/06401. Moreover, the tilt angle of the composition C is close to an ideal value and the temperature region for its SC* phase is extensive.

As is apparent from the foregoing, it has been found that the ferroelectric liquid crystal composition, which assumes the SC* phase in an extensive temperature region inclusive of room temperature and which has very high responsiveness, can be obtained by combining the non-chiral compound represented by the formula (IV) or (V) with the chiral compound having the formula (VIII) or (IX).

In view of the concentration ranges of the liquid crystal components A and B as well as the effect of the liquid crystal component C, the concentration of the liquid crystal component C is desirably 35% by weight or less.

When the concentration of the liquid crystal component C is less than 5% by weight, the effect of the added component C is not perceived unpreferably.

In the case that the absolute configuration of the optical activity site was S type, the direction of the spontaneous polarization of this compound was − type, and the twist direction of its helix was left.

(In the case that the absolute configuration was R type, they were + type and right.)

Incidentally, it is not desirable to prepare the ferroelectric liquid crystal composition from a compound in which the direction of the spontaneous polarization is opposite, because the thus obtained composition has the low spontaneous polarization value and the poor responsiveness unpreferably (e.g., see Japanese Patent Laid-Open No. 231,082/1986).

Therefore, the liquid crystal composition of the present invention comprises the compound represented by the general formula (VIII) or (IX) in which the direction of the spontaneous polarization is about the same.

As a result of regorous investigations, it has been found that in order to obtain the ferroelectric liquid crystal composition of the present invention effectively having excellent characteristics of the respective liquid crystal components A, B and C, a suitable ratio of these components is 20 to 70% by weight of the component A, 5 to 30% by weight of the component B and 5 to 35% by weight of the component C.

Compounds represented by the general formulae (X) to (XIII) which are the liquid crystal component D are chiral compounds, but their spontaneous polarization values are not so large. This component D plays the role of adjusting a helical pitch in the present invention, and thus it can be used when desired.

In the compounds represented by the formulae (XI) to (XIII), the twist direction of each helix is right in the case that the absolute configuration of the optical activity site is S type. That is, this twist direction is opposite to that of the compound represented by the general formula (VIII) or (IX) which is the above-mentioned liquid crystal component B or C, and thus when the compounds of the formula (XI) to (XIII) are added, the ferroelectric liquid crystal composition having a wide helical pitch can be obtained.

Furthermore, the direction of the spontaneous polarization of the compounds represented by the formulae (XI) to (XIII) is + type in the case that the optical activity site is S type (however, the direction of the spontaneous polarization of the compound in which Y in the formula (XIII) is CN is − type). This direction of the spontaneous polarization is opposite to that of the compound having the formula (VIII) or (IX). However, the compounds of the formulae (XI) to (XIII) has very small spontaneous polarization values (about 1 nC/cm$^2$) and a low concentration, and therefore they do not affect the ferroelectric liquid crystal composition of the present invention so as to prevent the responsiveness from heightening.

In the compound represented by the formula (X), the absolute arrangement of the optical activity site is S type, and the twist direction of its helix is right in the case that J is an even number and it is left in the case that J is an odd number. On the other hand, when the absolute arrangement is R type, the twist direction of the helix is left in the case that J is an even number and it is right in the case that J is an odd number. The direction of the spontaneous polarization of the compound having the formula (X) becomes "+" or "−" in accordance with whether J is an odd or even number, but like the compounds represented by the formulae (XI) to (XIII), the compound of the formula (X) does not affect the enchancement of the responsiveness, since it has the small spontaneous polarization.

Typical examples of the compounds represented by the general formulae (X) to (XIII) which are the liquid crystal component D are as follows:

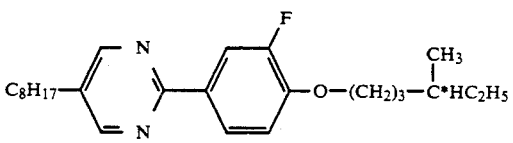

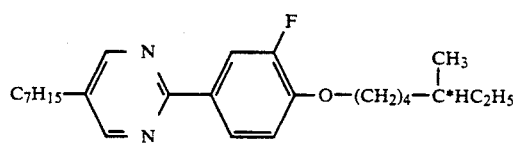

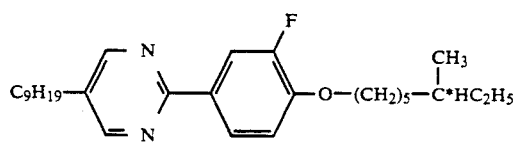

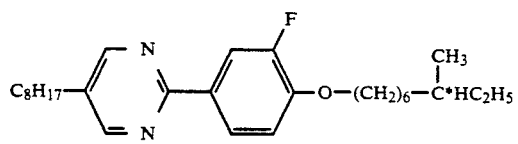

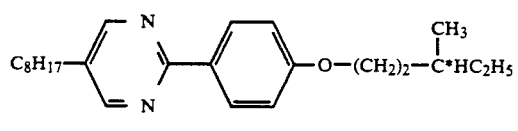

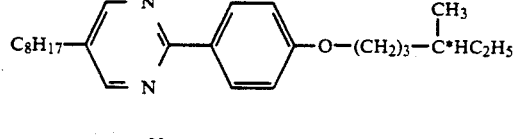

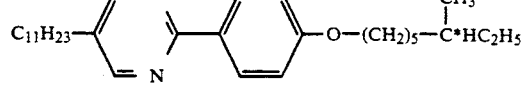

-continued
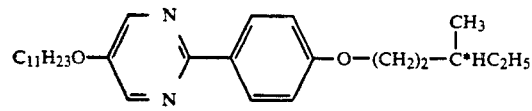
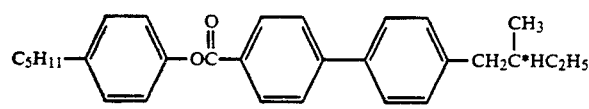
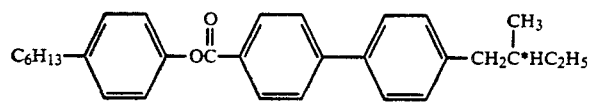
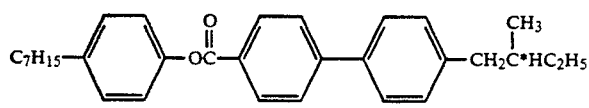
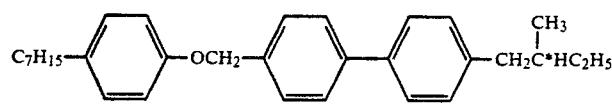
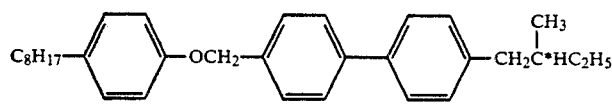
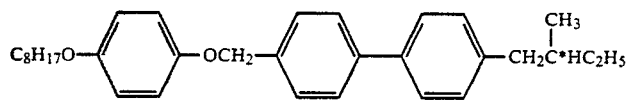
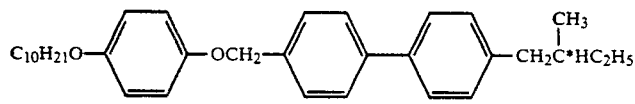
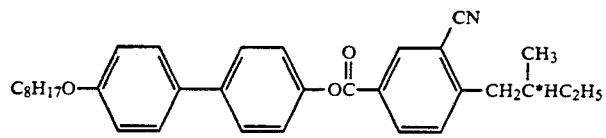
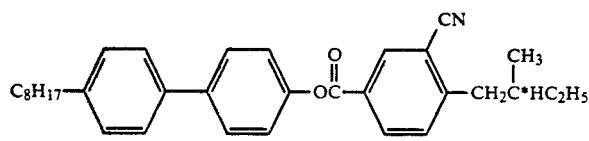
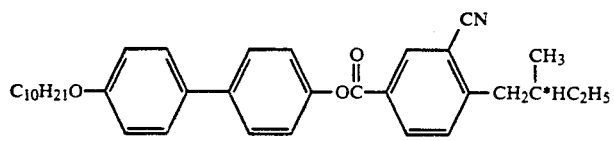
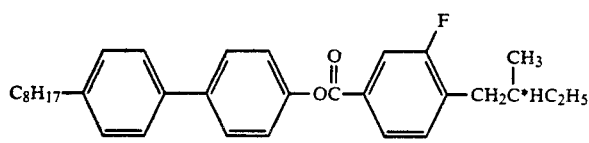

-continued

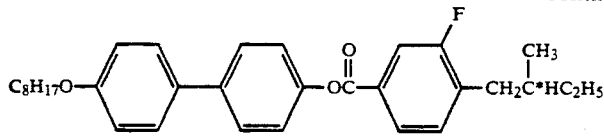

The liquid crystal component D can be used to adjust the helical pitch of the ferroelectric liquid crystal composition, if necessary, and furthermore, the component D has the small spontaneous polarization and a slightly longer response time than the components B and C. Therefore, in view of the concentrations of the liquid crystal components A, B and C, and taking the effect of the component D into consideration, the concentration of the component D in the ferroelectric liquid crystal composition of the present invention is preferably 25% by weight or less with respect to the total amount of the components A, B and C.

When the liquid crystal component D is less than 5% by weight based on the total weight of the components A, B and C, the effect of adjusting the helical pitch is not perceived unpreferably.

The liquid crystal component D is for the adjustment of the helical pitch, and therefore materials of the component D are not limited to the compounds represented by the general formulae (X) to (XIII). Needless to say, compounds which contain groups each having the optical activity site such as

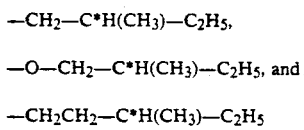

can be used in the ferroelectric liquid crystal composition of the present invention.

In order to obtain the ferroelectric liquid crystal composition of the present invention effectively having excellent characteristics of the respective liquid crystal components A, B, C and D, a suitable ratio of these components is 20 to 75% by weight of the component A, 5 to 30% by weight of the component B, 5 to 35% by weight of the component C and 5 to 25% by weight of the component D based on the total weight of the components A, B and C.

In an experiment, when a chiral compound having the optical activity site group of the general formula (I) was blended with a ferroelectric liquid crystal composition containing a non-chiral compound of the SC and other phases, a new ferroelectric liquid crystal composition having high responsiveness and assuming an SC* phase in a wide temperature range inclusive of room temperature could be obtained. Furthermore, by using this composition, an optical switching element having quick response could be obtained.

When the liquid crystal component C is additionally added to the composition of the present invention, the responsiveness of the composition can be further heightened, its tilt angle can be further improved, and the upper temperature of its SC* phase can be further elevated effectively.

Moreover, when the liquid crystal component D is additionally blended, the helical pitch can be adjusted effectively.

The present invention can provide the ferroelectric liquid crystal composition which is important for the manufacture of quickly responsive switching elements.

EXAMPLES

The present invention will be described in detail in reference to examples, but the scope of the present invention should not be limited to these examples.

Values of spontaneous polarization (PS) were measured by the Sayer-Tower method, and values of helical pitch (P) were determined by directly measuring each interval between striped lines (dechiralization lines) corresponding to the helical pitch under a polarizing microscope by the use of a cell having a thickness of about 200 μm which had been subjected to homogeneous alignment. Tilt angles ($\theta$) were determined by first applying sufficiently high electric field of critical field or more to the cell which had been subjected to the homogeneous alignment, extinguishing a helical structure, reversing polarity, and measuring a mobile angle (corresponding to $2\theta$) of an extinction phase under crossed prisms.

A response time was determined by putting each composition in the cell having an electrode interval of 2 μm which had been subjected to an alignment treatment, and measuring a change in intensity of transmitted light at the time when a rectangular wave having Vpp of 20 V and 100 Hz was applied.

EXAMPLES 1 to 12

Ferroelectric liquid crystal compositions regarding the present invention in Examples 1 to 11 are set froth in Table 1, and characteristics thereof are set forth in Table 2. The figures in Table 1 are on percent by weight.

TABLE 1

| Component | Formula | Compound | \multicolumn{12}{c}{Example No.} |
|---|---|---|---|---|---|---|---|---|---|---|---|---|---|---|
| | | | 1 | 2 | 3 | 4 | 5 | 6 | 7 | 8 | 9 | 10 | 11 | 12 |
| A | IV | $C_6H_{13}O$–⟨phenyl⟩–pyrimidine–$C_8H_{17}$ | 6.4 | 11.4 | 9 | 5.5 | 10.8 | 6 | 11 | 9 | 6.3 | 8 | 5.6 | 5.5 |
| A | IV | $C_8H_{17}O$–⟨phenyl⟩–pyrimidine–$C_8H_{17}$ | 3.2 | 5.7 | 4.5 | | | | 5.5 | 4.5 | | 4 | | |
| A | IV | $C_9H_{19}O$–⟨phenyl⟩–pyrimidine–$C_7H_{15}$ | 1 | 1.7 | 1.4 | | 1.5 | | 1.7 | 1.4 | | 1.2 | | |
| A | IV | $C_9H_{19}O$–⟨phenyl⟩–pyrimidine–$C_8H_{17}$ | 1.6 | 2.9 | 2.3 | | 3 | | 2.8 | 2.3 | | 2 | | |
| A | IV | $C_{10}H_{21}O$–⟨phenyl⟩–pyrimidine–$C_8H_{17}$ | 1.6 | 2.9 | 2.3 | | | | 2.8 | 2.3 | | 2 | | |
| A | V | $C_5H_{11}$–⟨biphenyl⟩–pyrimidine–$C_6H_{13}$ | 6.2 | 10.8 | 8.6 | | 8.5 | 6 | 10.5 | 8.6 | 6.3 | 7.6 | | |
| A | V | $C_5H_{11}$–⟨biphenyl⟩–pyrimidine–$C_7H_{15}$ | | | | | | | | | 6.3 | | | |
| A | V | $C_5H_{11}$–⟨biphenyl⟩–pyrimidine–$C_8H_{17}$ | 4.2 | 7.4 | 5.9 | | | 5 | 12.2 | 10.9 | | 10.2 | | |

TABLE 1-continued

| Component | Formula | Compound | 1 | 2 | 3 | 4 | 5 | 6 | 7 | 8 | 9 | 10 | 11 | 12 |
|---|---|---|---|---|---|---|---|---|---|---|---|---|---|---|
| A | V | $C_6H_{13}$–[biphenyl]–pyrimidine–$C_6H_{13}$ | 8 | 14.2 | 11 | 5.5 | 5.5 | 6 | 13.5 | 11 | 6.3 | | 5.6 | 5.5 |
| A | V | $C_7H_{15}$–[biphenyl]–pyrimidine–$C_6H_{13}$ | | | | 5.5 | 7.7 | | | | 6.3 | 10 | 5.6 | 5.5 |
| A | V | $C_7H_{15}$–[biphenyl]–pyrimidine–$C_8H_{17}$ | | | | | | 5 | 5 | 5 | 6.3 | 5 | | |
| A | V | $C_8H_{17}$–[biphenyl]–pyrimidine–$C_6H_{13}$ | | | | 5.5 | 5.5 | 6 | | | 6.3 | | 5.6 | 5.5 |
| A | VI | $C_7H_{15}$–[phenyl]–pyridine–$OC_4H_9$ | 3.3 | | 3 | 5.5 | 5.5 | 6 | | | | | 5.6 | 5.5 |
| A | VI | $C_7H_{15}$–[phenyl]–pyridine–$OC_8H_{17}$ | 3.3 | | 3 | 5.5 | 5.5 | 6 | | | | | 5.6 | 5.5 |
| A | VI | $C_7H_{15}$–[phenyl]–pyridine–$OC_{11}H_{23}$ | 3.3 | | 3 | 5.5 | 5.5 | 6 | | | 6.3 | | 5.6 | 5.5 |
| A | VI | $C_8H_{17}$–[phenyl]–pyridine–$OC_8H_{17}$ | 3.3 | | 3 | 5.5 | 5.5 | 6 | | | | | 5.6 | 5.5 |

TABLE 1-continued

| Component | Formula | Compound | 1 | 2 | 3 | 4 | 5 | 6 | 7 | 8 | 9 | 10 | 11 | 12 |
|---|---|---|---|---|---|---|---|---|---|---|---|---|---|---|
| A | VI | $C_8H_{17}$—〈pyridine-phenyl〉—$OC_{10}H_{21}$ | | | | | | | | | 6.3 | | | |
| A | VI | $C_9H_{19}$—〈pyridine-phenyl〉—$OC_6H_{13}$ | 3.3 | | 3 | | | | | | | | | |
| A | VI | $C_{10}H_{21}$—〈pyridine-phenyl〉—$OC_{12}H_{25}$ | 3.3 | | 3 | 5.5 | 5.5 | 6 | | | 6.3 | | 5.6 | 5.5 |
| A | VII | $C_8H_{17}O$—〈biphenyl〉—$(CH_2)_3CHC_2H_5$ ($\pm$) with $CH_3$ | | | | | | | | | 7 | 15 | | |
| B | VIII | $(S)C_8H_{17}O$—〈biphenyl〉—$OCH_2CH*OCC_3H_7$ with $CH_3$, O | | | | | | | 5 | 10 | | 5 | | |
| B | VIII | $(S)C_8H_{17}O$—〈biphenyl〉—$OCH_2C*HOCC_4H_9$ with $CH_3$, O | 8 | | | 10 | 10 | 12 | 10 | 10 | 10 | 10 | 10 | 10 |
| B | VIII | $(S)C_8H_{17}O$—〈biphenyl〉—$OCH_2C*HOCC_6H_{13}$ with $CH_3$, O | | 13 | 15 | | 10 | 10 | 15 | 15 | 10 | 15 | 10 | 15 |
| C | IX | $(S)C_6H_{13}$—〈F-phenyl-phenyl-OC(=O)-phenyl〉—$OC*HC_6H_{13}$ with $CH_3$ | 20 | 10 | 20 | 10 | 10 | 10 | 10 | 10 | 10 | 10 | 10 | 10 |

TABLE 1-continued

| Component | Formula | Compound | 1 | 2 | 3 | 4 | 5 | 6 | 7 | 8 | 9 | 10 | 11 | 12 |
|---|---|---|---|---|---|---|---|---|---|---|---|---|---|---|
| C | IX | F-biphenyl-COO-phenyl with (S)C$_7$H$_{15}$ and OC*HC$_6$H$_{13}$/CH$_3$ | 5 | | | 5 | 5 | | | | | | 4 | |
| C | IX | F-biphenyl-COO-phenyl with (S)C$_8$H$_{17}$ and OC*HC$_6$H$_{13}$/CH$_3$ | | 5 | | | | | | 5 | 5 | | | |
| C | IX | biphenyl-COO-phenyl with (S)C$_7$H$_{15}$ and OC*HC$_6$H$_{13}$/CH$_3$ | | | | 5 | 5 | | | | | 10 | | 5 |
| C | IX | biphenyl-COO-phenyl with (R)C$_7$H$_{15}$ and OC*HC$_6$H$_{13}$/CH$_3$ | | | | | | | | | | 10 | 10 | |
| D | X | F-phenyl-pyrimidine with (S)C$_8$H$_{17}$ and O—(CH$_2$)$_3$—C*HC$_2$H$_5$/CH$_3$ | 20 | 10 | 5 | 5 | | | | | | | | |
| D | X | F-phenyl-pyrimidine with (S)C$_8$H$_{17}$ and O—(CH$_2$)$_4$—C*HC$_2$H$_5$/CH$_3$ | | 10 | | 5 | | | | | | 10 | | |
| D | X | F-phenyl-pyrimidine with (S)C$_8$H$_{17}$ and O—(CH$_2$)$_5$—C*HC$_2$H$_5$/CH$_3$ | | | | 10 | | | | | | | | 5 |

TABLE 1-continued

| Component | Formula | Compound | Example No. | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| D | X | (S)C$_5$H$_{11}$–[cyclohexyl(H)]–OC(=O)–[phenyl]–[phenyl]–CH$_2$C*C$_2$H$_5$(CH$_3$) | | | | | | 5 | | | | | | 5 |
| D | XII | (S)C$_8$H$_{17}$–[phenyl]–OCH$_2$–[phenyl]–[phenyl]–CH$_2$C*HC$_2$H$_5$(CH$_3$) | | | | | | 5 | | | | | | |
| D | XIII | (S)C$_8$H$_{17}$–[phenyl]–[phenyl]–OC(=O)–[phenyl(CN)]–CH$_2$C*HC$_2$H$_5$(CH$_3$) | | | | | | | 5 | 5 | | | | |

TABLE 2

| Characteristics | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Phase Transition Temperature (°C.) | | | | | | | | | | | | |
| Cr → SC* | −17 | −7 | −2 | −31 | −26 | −26 | −6 | −7 | −15 | −8 | −34 | −34 |
| SC* → SA | 57 | 59 | 57 | 59 | 67 | 71 | 69 | 59 | 73 | 61 | 61 | 59 |
| SA → N* | 71 | 72 | 71 | 72 | 76 | 81 | 80 | 74 | 82 | 73 | 73 | 73 |
| N* → ISO | 75 | 85 | 80 | 75 | 85 | 90 | 94 | 86 | 92 | 80 | 78 | 82 |
| Spontaneous Polarization* (nC/cm²) | 19 | 22 | 26 | 21 | 17 | 19 | 28 | 31 | 19 | 28 | 15 | 14 |
| Helical Pitch* (μm) | 2 | 2 | 2 | 2 | 2 | 4 | 3 | 3 | 2 | 3 | 7 | 8 |
| Tilt Angle* (°) | 25 | 27 | 26 | 26 | 28 | 28 | 27 | 25 | 29 | 25 | 26 | 27 |
| Response Time* (μsec) | 90 | 80 | 75 | 80 | 70 | 75 | 60 | 90 | 60 | 60 | 75 | 80 |

*Values at 25° C.

EXAMPLE 13

The ferroelectric liquid crystal composition prepared in Example 4 was put in a cell prepared by coating with PVA of an alignment agent and then rubbing on surfaces to perform parallel alignment, the cell being equipped with a pair of transparent electrodes and having a cell gap of 2 μm. This liquid crystal cell was interposed between two polarizers arranged in the crossed nicol state, and low-frequency alternating current of 0.5 Hz and 20 V was applied to the cell. In the thus formed liquid crystal display element, switching behavior was sharp and was very excellent in contrast (1:20), and response time was short, 40 μsec at 25° C.

EXAMPLE 14

To the ferroelectric liquid crystal composition prepared in Example 9 was added 3% by weight of anthraquinone series dye D-16 (made by BDH Co., Ltd.) represented by the formula

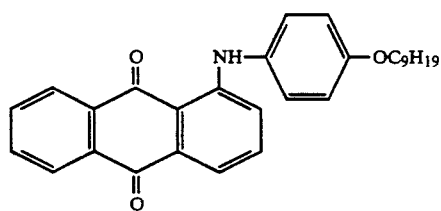

in order to prepare a guest/host type composition. The latter was then put in a cell having a cell gap of 8 μm which had been subjected to the same treatment as in Example 13. One polarizer was arranged so that a polarizing plane might be in parallel with a molecular axis, and low-frequency alternating current of 0.5 Hz and 40 V was applied thereto. In the thus formed liquid crystal display element, switching behavior was sharp and was very excellent in contrast (1:10), and response time was short, 80 μsec at 25° C.

What is claimed is:

1. A ferroelectrical liquid crystal composition which comprises a mixture of the following three liquid crystal components A, B and C, and the ratio of these components being 20 to 75% by weight of A, 5 to 30% by weight of B and 5 to 35% by weight of C with respect to the total weight of the three components:

said liquid crystal component A being composed of one or more selected from the group consisting of a compound represented by the general formula (IV)

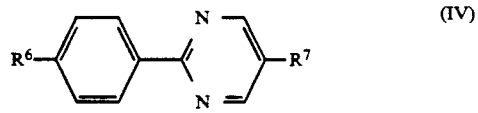

wherein $R^6$ and $R^7$ are identical or different and each of them is respectively an alkyl group or an alkoxy group having 1 to 18 carbon atoms, a compound represented by the general formula (V)

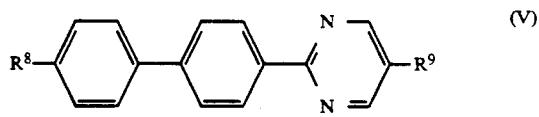

wherein $R^8$ and $R^9$ are identical or different and each of them is respectively an alkyl group or an alkoxy group having 1 to 18 carbon atoms, a compound represented by the general formula (VI)

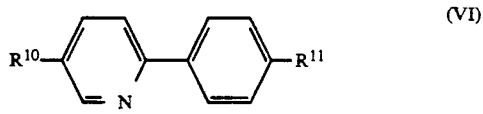

wherein $R^{10}$ and $R^{11}$ are identical or different and each of them is respectively an alkyl group or an alkoxy group having 1 to 18 carbon atoms, and a compound represented by the general formula (VII)

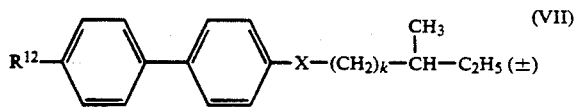

wherein $R^{12}$ is an alkyl group or an alkoxy group having 1 to 18 carbon atoms, X is no group or an oxygen atom, k is in the range of 0 to 10, and (±) represents a racemic compound;

said liquid crystal component B being composed of one or more of compounds represented by the general formula (VIII)

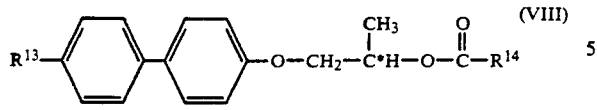

wherein $R^{13}$ and $R^{14}$ are identical or different and each of them is respectively an alkyl group or an alkoxy group having 1 to 18 carbon atoms, and * indicates an asymmetric carbon atom;

and said liquid crystal component C being composed of one or more of compounds represented by the general formula (IX)

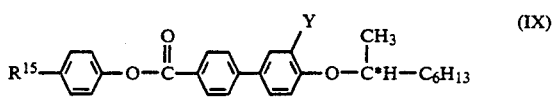

wherein $R^{15}$ is an alkyl group or an alkoxy group having 1 to 18 carbon atoms, Y is H, F or CN, and * indicates an asymmetric carbon atom.

2. An optical switching element using said ferroelectric liquid crystal composition described in claim 1.

* * * * *